United States Patent [19]

Searle

[11] Patent Number: 5,643,513

[45] Date of Patent: Jul. 1, 1997

[54] METHOD OF USING A FORM FIT SYSTEM FOR SHELL-TYPE SEATS AS USED IN HIGH-PERFORMANCE VEHICLES

[76] Inventor: David H. Searle, 2834 Rounsevel Ter., Laguna Beach, Calif. 92651

[21] Appl. No.: 213,156

[22] Filed: Mar. 15, 1994

[51] Int. Cl.$^6$ .................................................. B29C 44/06
[52] U.S. Cl. ......................... 264/46.5; 264/46.6; 264/222
[58] Field of Search ................................ 264/222, 338, 264/46.4, 46.5, 46.6

[56] References Cited

U.S. PATENT DOCUMENTS

| | | | |
|---|---|---|---|
| 4,327,046 | 4/1982 | Davis et al. | 264/222 |
| 4,347,213 | 8/1982 | Rogers, Jr. | 264/222 |
| 4,615,856 | 10/1986 | Silverman | 264/222 |
| 4,828,325 | 5/1989 | Brooks | 264/222 |
| 4,890,235 | 12/1989 | Reger et al. | 264/222 |
| 5,382,223 | 1/1995 | Springs | 602/6 |

FOREIGN PATENT DOCUMENTS 2250681  4/1974  Germany .................. 264/222

*Primary Examiner*—Allan R. Kuhns

[57] ABSTRACT

The essence of the technique is to superimpose a shaped elastic membrane/cover over a seat shell and lock the membrane to the edge of the seat shell with a channel-section trim. The uppermost edge of the cover is left temporarily unattached to the seat so an incipiently-reacting foam, mixed in a volume predetermined to be in excess of what is necessary, can be poured between the membrane and the shell. The subject is then seated and the foam expands to provide positive support for the anatomy and fill all the voids between the body's impression in the membrane and the seat shell, thereby making a full-contact mold of the body. Overflow is allowed to escape at the uppermost portion of the seat where it is captured in a bag that also serves to contain noxious chemical vapors. Foam may be of a rigid or resilient type to vary the support and cushion provided. The chemical action of the foam creates an adhesive bond between the membrane, foam, and the shell, and when the outer surface of the membrane incorporates a stretchable fabric finish, the method produces an attractive upholstered appearance simultaneously with the custom fit. If the bond between the reacting foam and the shell is prevented by a mold release agent or plastic sheet, a removable form is produced allowing the fitting of different drivers in the same shell.

5 Claims, 3 Drawing Sheets

Side View

Enlarged View

METHOD OF USING A FORM FIT SYSTEM FOR SHELL-TYPE SEATS AS USED IN HIGH-PERFORMANCE VEHICLES

BACKGROUND

1. Field of Invention

This invention relates to the requirements for seating in high-performance vehicles, specifically to a simplified method for creating an accurate form-fit in the types of seats currently used in such applications.

High-performance vehicles typically have the ability to change speed and direction very rapidly. The driver/pilot feels this action as if the body were being pushed violently this way and that by the seat and safety belts. When maximum speeds are attempted, even a few minutes of such activity can be exhausting to the uninitiated. However, some competitive events last for hours. Seating that can provide superior comfort will therefore improve endurance, overall performance, and ultimately safety.

The need to make spontaneously calculated and deliberate but discreet control inputs, in spite of rough conditions, while in hazardous exploration of the machine's performance limits requires seating that precisely locates the driver's body with reference to the vehicle's controls. Therefore proper seating must not only spare the body from unnecessary punishment, but comfort must be achieved without compromising control, and also without insulating the driver from vital sensory feedback of the machine's limits. This invention addresses that need.

2. Description of Prior Art

The first turn at the Indianapolis Motor Speedway is banked at only 13 degrees but drivers there routinely see lateral accelerations from cornering that reach 2.4 G. Grand Prix-type racing boats are said to generate 4 G. turning corners. The fastest drag-racing vehicles currently have peak accelerations that reach nearly 5 G. Even simple racing karts (competition go-karts) record 1.6 G. in steady-state cornering on level asphalt, approximately twice the lateral force a modern passenger car can achieve. Very high-banked turns, vibration from engines, rough track conditions, and accidents all increase the rate and magnitude of forces delivered to the driver's body dramatically.

While it might seem best to provide the maximum mount of soft cushioning to protect the driver/pilot from such a beating, the most successful racing drivers are unanimous in desiring an absolute minimum of cushion. The physical feedback necessary to sense the dynamic limits of the vehicle is often said to originate at the "seat of the pants" and soft cushioning is found to insulate the driver from the reactions of the vehicle to control inputs.

Each form of racing has it own particular constraints in regard to seating. Open-wheeled cars of the Grand Prix, Indy, or Formula type have cockpits that are very tight around the body of the driver, and require a semi-reclining driving position. A few top drivers at this level of motorsport are provided by their teams with individually-made custom-fitted seats to maximize the driver's ability and endurance as well as provide the best protection against accidents. These seats have been produced by customizing standard design seats or by creating molds of the individual driver's body either in plaster bandages, or by the utilization of specially-shaped bags containing loose styrene beads that are vacuumed to create a rigid female mold so that a male impression of the driver's torso can then be obtained for the purpose of creating an appropriate shell in either glass fiber or carbon fiber. Although the custom-fitted seat produced by such techniques appears to be a good solution to the problem of high-performance vehicle seating, the complication, technical skill, and equipment required to produce such seats has made them unavailable or cost-prohibitive to all but the most highly-paid drivers.

A further drawback is that the final result of such methods, being a third-generation image of the driver's body, may not be entirely satisfactory either in terms of precise fit or because the original mold, having been created outside the actual relationship of the driver to the controls (steering wheel, pedals, shifter, etc.) may not produce an ideal ergonomic relationship to control the vehicle. Therefore, although the fit may allow the driver to resist dynamic forces adequately, the body position may resist being harmonized with the controls, producing debilitating fatigue and reduced performance over time.

It is also significant that the actual body support produced by such methods is derived from molds of the anatomy taken while the flesh is slumped by gravity. This is inferior to what could be achieved by capturing a mold of the body while positive pressure is applied over that surface of the body which is to be supported by the seat. Such a positive-support seat form would also serve to precompress the soft portions of the anatomy, as in the kidney area, and provide greater resistance to injury from shocks or accidents.

An inexpensive and widely-known method for fitting a driver to a single-seat-type vehicle where the driver has no separate seat but simply reclines in a narrow area formed by the structural panels of the chassis, is to have the driver sit on a large household-type polyethylene trash bag that has had a mixture of reacting polyurethane foam placed inside. The expansion of the foam creates a crude but useful seat form that can be trimmed and covered with fabric-reinforced tape to fashion a functional form-fitting seat. Drawbacks of this method are: (1) That the wrinkles that unavoidably form in the bag create airpockets that become voids during foaming. (2) Shaping the foam removes its skin, exposing a softer, less resilient composition that is not as durable. (3) The finished result lacks the quality appearance desirable in a custom racing vehicle. (4) Very little desirable positive pressure-support of the body is created as the foam is effectively allowed to expand virtually in all directions under the body.

In competition vehicles where sufficient room is present to allow the installation of specially-fabricated racing seats, the seats typically have rigid shells formed of aluminum or glass fiber. Only available in limited sizes meant to accomodate the greatest number of body shapes, their designs are anatomically crude and often simplified for ease of manufacturing and/or mounting to the vehicle.

The glass fiber variations can have smooth curves and are often used without padding of any kind, but glass fiber types with overlaid thinly-padded seat covers, either glued-in or removable, are also available. Aluminum seats, although rated stronger than the glass fiber type, are the least anatomically accurate due to their difficulty of fabrication. They are formed from bent and welded sheet (typical thickness 0.081–0.125 inch) into boxy shapes that have a virtually flat surface to support the back, a bottom panel formed in a shallow angle to support the buttocks and upper thighs, and flat side panels that can be bent over the rib cage to limit side-to-side movement of the body. Aluminum seats typically incorporate upholstery of thin foam padding covered with expanded vinyl or fabric that is either glued-in-place or in a slip-on style that secures with snaps. Both the glass fiber and aluminum types fit poorly compared with a custom seat contoured to an individual driver's body.

The effect of any seat that does not conform precisely to the unique configuration of an individual driver's body is to heavily concentrate dynamic loads on the points of the body closest in proximity to the contours of the seat in question. In practice, this can lead to forces many times the driver's own weight being concentrated over small areas on the body such as the high spots on the hip bones, rib cage, etc. Severe bruising and even bleeding at the hips, and brusied and broken ribs are not uncommon in racing drivers, even without accidents or collisions.

Previous patents regarding seating have been largely in two areas: First are methods to produce passenger-car-type seating by more efficient mass-production techniques, none of which lend themselves economically to the creation of individualized custom seating. Second are methods concerned with seating for handicapped or disabled persons confined to wheelchairs where the object is comfort during prolonged immobility.

The body-shaped cushions devised for wheelchair application are the nearest reference to form-fitting seating. U.S. Pat. No. 3,830,896 to Contourpedic Corp. (Jun. 8, 1972) and U.S. Pat. No. 4,615,856 to Silverman (Jul. 29, 1985) propose the use of styrene pellets to obtain a primary mold, similar to the first of the racing methods described above.

U.S. Pat. No. 4,753,480 to Morell (May 14, 1987) proposes a technique for assembling resilient foam material into cushioning pads of varying density. This system does not produce a true form-fit and, as mentioned, cushioning in general allows misalignment of the driver to the controls and deprives the driver of critical sensory feeback needed to approach the vehicle's limits of performance.

U.S. Pat. No. 4,828,325 to University of Tennessee Research Corp. (Sep. 29, 1987) proposes a technique for producing elastic seat and back cushions for assembly into a wheelchair frame that are molded to the body of the patient. Again, the described deep cushioning, desirable in a wheelchair, is not desirable in a racing vehicle. Also, the specialized mold boxes do not lend themsleves to the often-cramped confines of a racing vehicle where keeping the driver as low as possible in the vehicle to reduce the overall center of gravity can be essential. Separate seat and back cushion sections requiring separate molding operations while maintaining matching body positions, special foam injection fittings, hydrocarbon blowing equipment, heat sensors, and a knowledge of foam chemistry sufficient to limit the temperature of the reacting mixture below what a subject being molded could tolerate all tend to limit the technique to expensive specialists. Furthermore, the sling arrangement suggested for placing the person to be molded in suspension over the reacting foam will itself alter the ideal shape of the body to be supported by the cushion thus created.

OBJECTS AND ADVANTAGES

To provide the various advantages of fully form-fitting seating to sportsmen and others that might benefit from its use in a simple, inexpensive, easy-to-install kit adaptable to the shell-type seats currently used in high-performance vehicles. In addition to the comfort and control advantages previously attributed to form-fitting seating, improvements are achieved by this formulation. Also, several hitherto unexpected advantages have become apparent when form-fitting seating is used in the lightest and least-expensive class of racing vehicle, racing karts, which for reasons of cost and complication have been the least likely to employ it.

In a racing kart, the driver often weighs more than the chassis and engine combined. When attacking a turn at maximum speed the slight but sudden side-shift of the body weight in a seat that does not adequately secure the driver is enough to exceed the tires' traction limits. This creates a situation where the driver must fight to restore control virtually at the beginning of the turn or make an approach at lower speed. Securely locating the driver in a form-fitting seat allows a smoother approach by eliminating this traction-overload condition, allowing the driver to use more speed, reducing lap times and producing a possible winning advantage.

Further, because a racing kart traditionally utilizes no suspension system other than tire compliance and frame flexibility, and does without shock absorbers or other damping devices, these machines provide a relatively violent ride. Not only is undamped force freely transmitted to the driver through the seat, but the jostling of the driver's body in a loose-fitting seat causes oscillation of the chassis, which can easily become harmonically magnified into a kart's characteristic "side hop" of alternating traction and slip during cornering, which is particularly brutal to the driver. On rough tracks, kart racers will try to use the steering wheel to provide lateral support for the body in an attempt to reduce the hammering caused by clearance between the torso and seat, in effect using their muscles as a damping medium. Unfortunately, this makes the primary job of accurate steering control less sensitive and is also a great source of upper-body muscle fatigue to the driver. However, when supported in a form-fitting seat, the oscillation induced by clearance between the driver and seat is eliminated, and the need to use the steering mechanism for body support is greatly reduced, allowing more sensitive steering control, and greater endurance. Both factors improve performance on the track to a significant degree.

As the racing machine in question becomes heavier in relation to driver weight, or has more compliant suspension, the factors above can become less significant than they are in kart racing but will still have some degree of importance to overall performance. However, in light of this system's special advantages to kart racing, this was the application first put into production.

Furthermore, this invention:

(a) Produces an ergonomically-correct, fully-contoured fit of that portion of the body supported by the seat shell. Also, the body support provided by this method is superior to what is achieved by the prior art molding schemes described in the Background section. Since the reacting foam is essentially trapped between the body's impression in the elastic membrane/cover and a close-fitting seat shell, the foam's expansion creates a positive pressure against the anatomy during set-up that results in contours that provide superior support, enhancing comfort, endurance, control sensitivity, and resistance to injury.

(b) Produces simultaneously an attractive and durable upholstery covering which both shapes the surface of and becomes attached to this mold of the body, so that a fully-finished seat appearance results, without the need for a separately-fitted seat covering. (c) Incorporates these desirable features into the elastic upholstery/membrane cover.

(1) An elastic tensile strength able to give pleasing shape to an expanding foam mixture.

(2) The ability to be stretched by portions of the driver's body with little or no folds or wrinkles.

(3) Reproduction of less texture in the finished seat surface than is presented on the clothing of the subject being molded.

(4) Sufficient impermeability to penetration by liquid foam materials.

(5) Self-gasketing qualities when the upholstery/membrane cover is locked over irregular thickness shell materials (such as fiberglass) and when existing edges on these shells are in typical rough-trimmed condition.

(6) Protection of the person being molded-in-place from the heat of the reacting foam mixture (average is 120° F.).

(7) A surface able to minimize friction and chafing between the body and a seat alive with vibration induced by engine/s and rough track/course conditions.

(d) Adapts to a wide variety of readily available shell-type seats with minimum adjustment. Typically only small, medium, and large patterns are required, and as they are not finished on the edges, simply providing extra material at the margins will allow the upholstery/membrane to be fitted to many different configurations of seat shells in those same sizes.

(e) Provides for a kit so adaptable as to be conveniently installed without the need for specialized knowledge or equipment even on seats that have been already positioned and mounted on or inside competition vehicles,.

(f) Provides a mold-in-place system that can be sold in combination with specially designed shell-type seats custom made for various requirements. This would allow the upholstery/membrane to be preinstalled so that only the introduction of the liquid foam and the capture of overflow would need attention during installation.

(g) Produces a form-fitting insert when the chemical bond between the expanding foam and the seat shell is prevented and the trim is unlocked after the foam has cured.

(h) Strengthens the seat on which the system is used and reduce particularly a glass fiber shell's dangerous tendency to crack. Since the system provides for a full-contact fit of the driver and reduces peak pressure applied to the body by increasing the surface area supporting that pressure, it likewise reduces the maximum point loading applied to the seat shell.

(i) Minimizes exposure of the person being molded and any assistants to chemical fumes released during foaming.

Further objects and advantages of my invention will become apparent from a consideration of the drawings and ensuing description.

Figure 1:
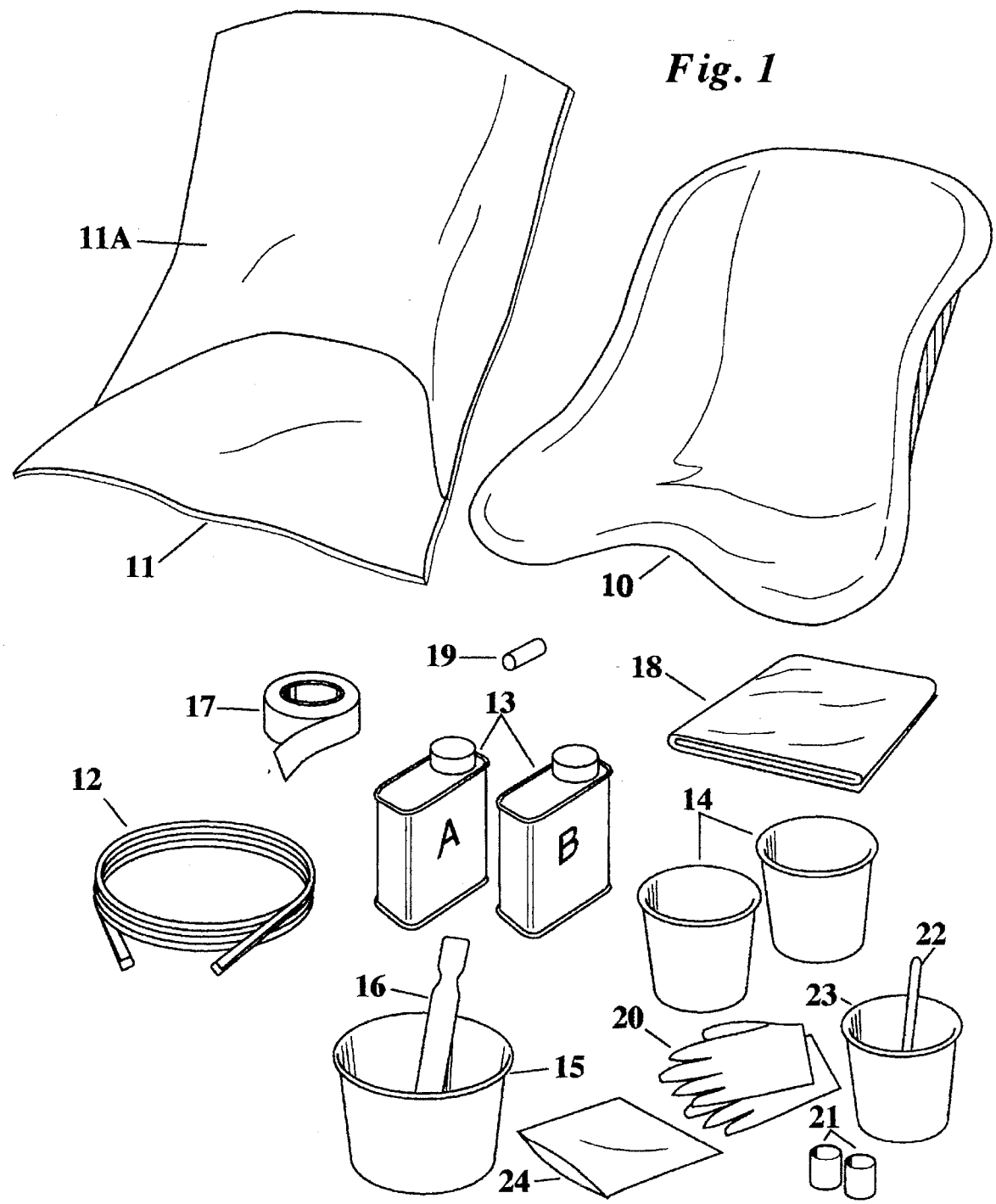
FIG. 1 is an isometric view of the material making up the kit arranged around a typical style of glass fiber racing seat.
Figure 2:
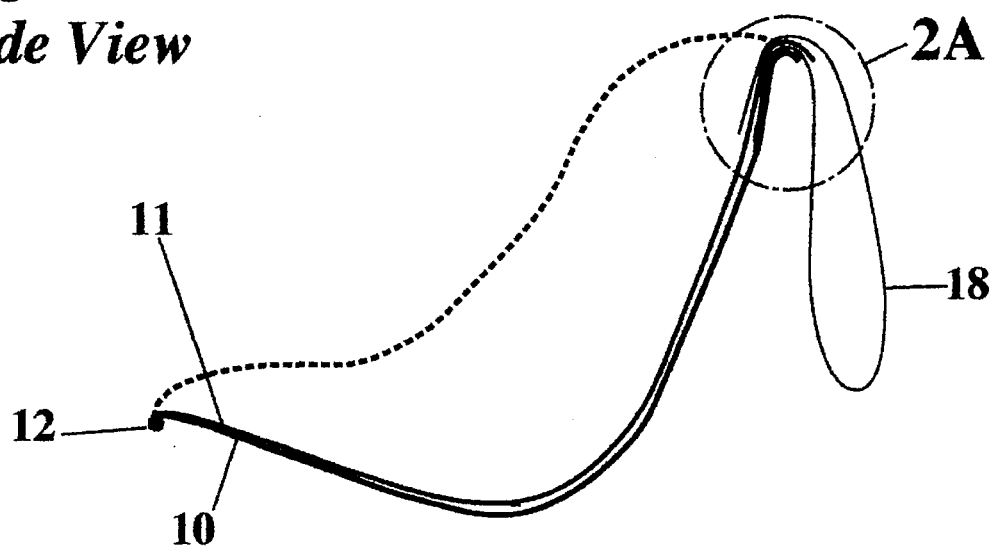
FIG. 2 is a cross-section view of the seat with the upholstery/membrane cover installed and FIG. 2A is a detail close-up of the foam overflow catch-bag position ready for driver seating.
Figure 2A:
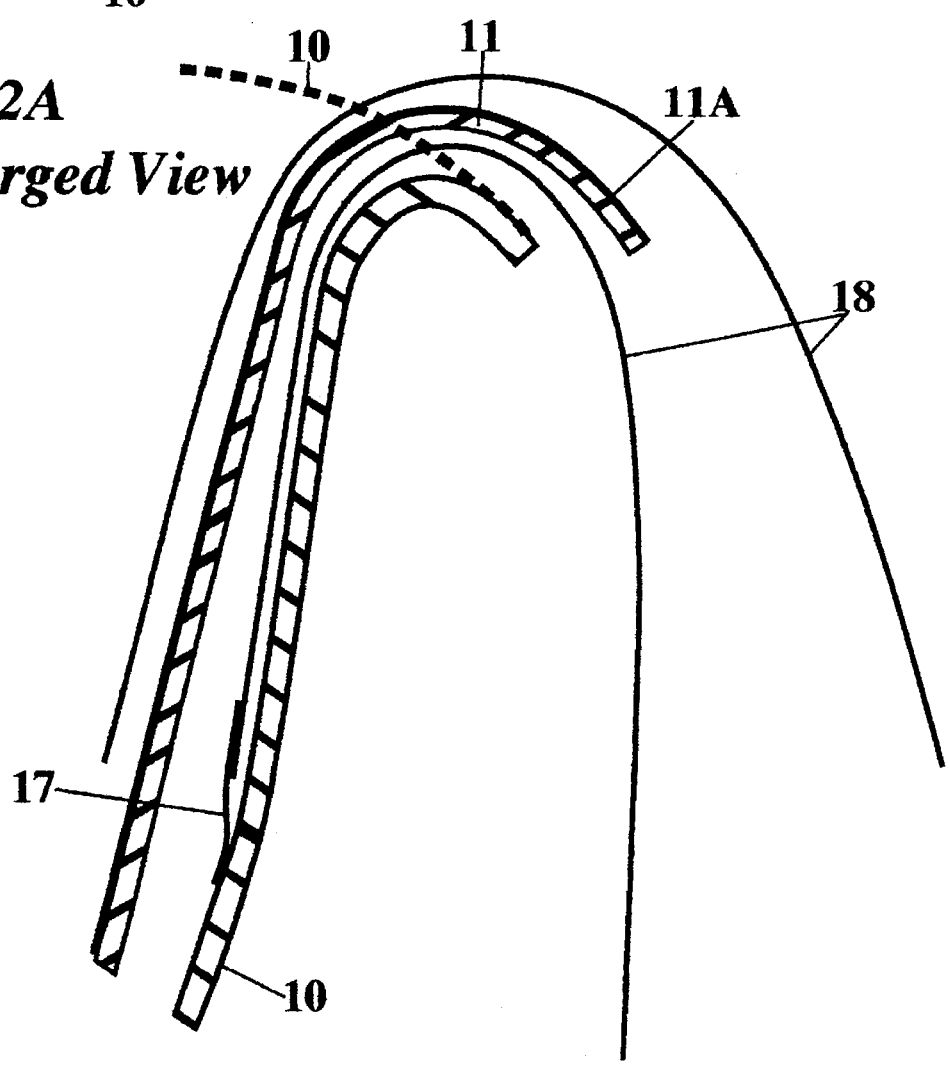

Reference Numerals in Drawings 10. typical style of glass fiber or carbon fiber racing seat shell [not part of the kit].
11. shaped elastic upholstery/membrane cover.
A. stretch jersey fabric layer bonded to upholstery/membrane cover.
12. channel section edge trim.
13. expanding foam binary components.
14. measuring cups.
15. mixing bucket.
16. stir stick.
17. tape.
18. overflow catch-bag.
19. chalk.
20. disposable gloves.
21. 1-ounce test cups.
22. small stir stick.
23. test mix cup.
24. test expansion bag.

DETAILED DESCRIPTION OF THE INVENTION

The essence of the technique is to superimpose a shaped elastic membrane/cover over a seat shell and lock the membrane to the edge of the seat shell with a channel-section trim. The uppermost edge of the cover is left temporarily unattached to the seat so an incipiently-reacting foam mixture can be poured between the membrane and the shell. The subject is then seated and the foam expands to provide positive support for the anatomy and fill all the voids between the body's impression in the membrane and the seat shell, thereby making a full-contact mold of the body.

Foam may be of a rigid or resilient type to vary the support and cushion provided. The chemical action of the foam creates an adhesive bond between the membrane, foam, and the shell, and when the outer surface of the membrane incorporates a stretchable fabric finish, the method produces an attractive upholstered appearance simultaneously with the custom fit. If the bond between the reacting foam and the shell is prevented by a mold release agent or plastic sheet, a removable form is produced allowing the fitting of different drivers in the same shell.

The shaped elastic membrane is installed so that it will be stretched into its final form by the body of the subject being molded and the pressure of the reacting foam mixture into a smoothly contoured impression.

The foam mixture is introduced into the pocket created between the upholstery/membrane and the shell in a volume predetermined to be in excess of what is necessary to fill the voids between the subject and the seat shell. Overflow is allowed to escape at the uppermost portion of the seat where it is captured in a bag that also serves to contain noxious chemical vapors. After foaming, the overflow is trimmed to the contour of the seat shell and the upholstery/membrane is wrapped over the shell edge and locked with the trim to complete the installation.

High-Density Neoprene & Stretch Jersey Laminate Cover

An elastic upholstery/membrane cover 11 is made from high-density 100% neoprene elastomer closed-cell polyurethane sheet material. A thickness of approximately 3.25 mm (⅛ inch from the manufacturer) has been found suitable.

Neoprene is polychloroprene and will not propagate a flame. It burns in the presence of a flame but is self-extinguishing when the flame is removed. It has high tensile strength, and excellent ozone, weather and wear resistance. It also provides desirable thermal insulation to prevent uncomfortable heat transfer from the reacting foam to the subject being molded. The neoprene surface provides a good grip and self-gasketing quality when clamped over aluminum or uneven glass fiber seat shell edges by the trim 12 to prevent leakage of foam materials 13 under pressure during the foaming reaction. Being a closed-cell material, is impermeable to the liquid state of the foam mixture as well.

The neoprene material has a stretch jersey fabric 11A laminated to its outer surface which increases its tensile strength while still allowing an elastic stretch of at least 145% in all directions to aid in conforming to the contours of the body. Once installed, the stretch jersey fabric 11A provides a low-friction surface that allows easy ingress and exit from the snug-fitting confines of the seat. The 3.25 mm neoprene underlayer provides a slight cushion that feels good to the hand, absorbs a degree of high-frequency vibration, helps to prevent chafing between the cothing and the body during long drives, and also serves to smooth the surface of the clothed body during molding to provide a more wrinkle-free mold impression on the surface of the seat than was present on the clothing during molding.

Figure 3:
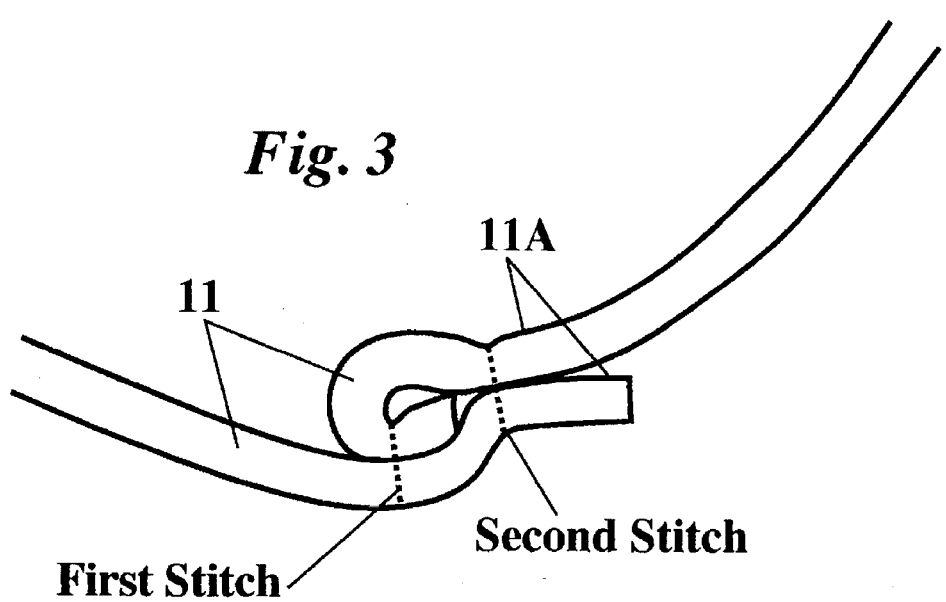
FIG. 3 is a cross-section detail of the sewn joint used to prevent leaks between sections of the upholstery/membrane cover.
Figure 4:
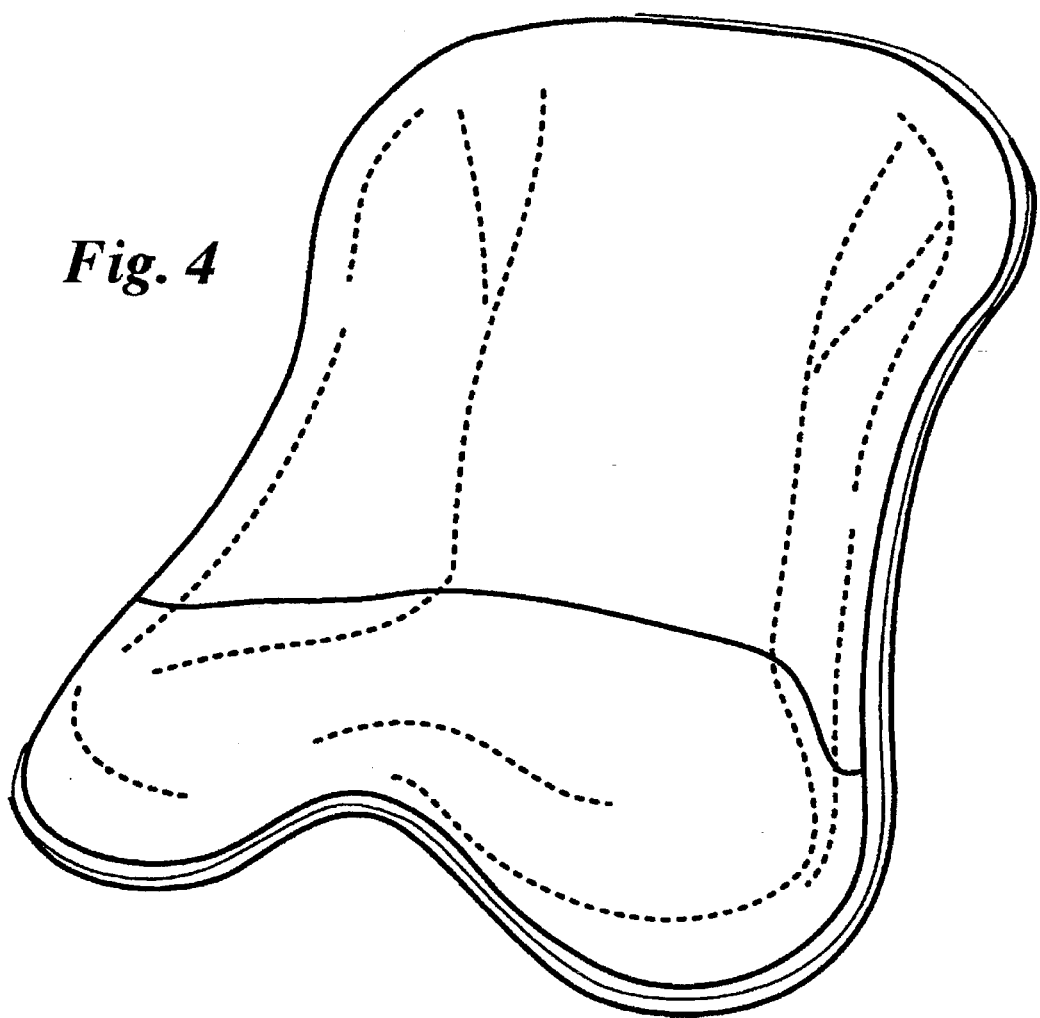
FIG. 4 is an isometric view of the completed installation with dotted lines suggesting the contours that could be produced.

In order to shape the laminated neoprene material to the approximate contours of the seated profile of the human body, the material is cut and sewn togther as shown in FIG. 3 using a seam design intended to minimize the possiblility of leakage by means of double stitching to prevent penetration by the liquid or reacting states of the foam mixture. The patterns created for the shape of the covers are not designed to fit the contours of the seat shells (which are anatomically inaccurate) but are designed to fit the body's impression in a preliminary form-fitting impression created by the foam-in-a-trashbag technique described in the prior-art section.

Aluminum-Reinforced Edge Trim

The edge trim 12 used on glass fiber seats (fiberglass shells have a typical thickness of 4.875 mm or 3/16 inch) has a channel width of 8.125 mm (5/16 inch) and is made up of a segmented aluminum (full hard #3004 H18) inner core 0.642 mm (0.024 inch) thick providing a strong grip, corrosion resistance, and light weight. The aluminum reinforcement is surrounded by an embossed extruded PVC (polyvinylchloride) outer coating with a hardness of 80 durometer (Shore A). The trim 12 used on aluminum seats has a channel width of 4.875 mm (3/16 inch) with the same aluminum core and PVC outer coating.

Polyurethane Foam

The expanding foam13 applied between the seat shell and upholstery/membrane is polyurethane foam. Rigid foam with a density of 2 lb/ft$^3$ is found ideal for this purpose as it is lightweight, has excellent adhesive qualities, and its rigidity creates a clear sensory feedback to the driver/pilot from the reactions of the machine to control inputs. Rigid polyurethane also has the advantage of being naturally more flame-retardant than flexible polyurethane and this can be a significant factor in racing or competition applications. However, flame-retardant additives such as phosphorus and halogen-containing molecules can be added to either rigid or flexible polyurethanes and may be required to meet the fire regulations of various competition sanctioning organizations.

For very rough conditions as might be encountered in off-road racing, etc., a flexible polyurethane formulation with a density of 5 lb/ft$^3$ gives firm support but more cushion to help the driver endure a long and/or extremely rough course. Regardless of whether glass fiber or flexible polyurethane foam13 is used, in this application it is not necessary to use chlorofluorocarbon (CFC) blowing to create the foam structure. Simple chemical blowing, sometimes called "water blowing," where the reaction of water and polyisocyanate create carbon dioxide gas, is sufficient and it will be appreciated that the continued use of CFC's in blowing polyurethanes is now considered a serious environmental hazard.

Preparation for Installation

Preparation for the installation begins with sealing any holes in the seat shell 10 that would allow leakage or misdirection of the expanding foam. These would include but not be limited to seat belt positioning slots or mounting holes of various kinds not in use. These are covered with an oversize patch placed on the side of the seat to be in contact with the foam and suggested to be of fabric-reinforced adhesive "duct tape" or a thin aluminum sheet with adhesive backing commonly sold for the purpose of auto body repair. Mounting bolts that pass through the seat shell are secured with epoxy glue or additional nuts outside the shell so that the need to remove the finished seat in the future will not require disturbing the installed cover and foam.

Installation is recommended on shells that have been stripped of any supplied upholstery covering. However, if desired, such coverings may be used over top of the form-fit system during foaming so they will become an integral part of the finished product. It may be necessary to recut such covers to match the shape of the driver's body, rather than shape of the seat shell, particularly the square-cornered type supplied with aluminum seats, if an attractive finished result is to be achieved.

As the aluminum-reinforced edge trim 12 cannot conform to curves tighter than a 52 mm (2 inch) radius, the seat shell 10, particularly if modified, may need to have its edge contours slightly reshaped to allow secure installation of the trim. The shell edge should be clean and free of grease and oil.

Trying the test kit

A test of the foam13, including proper safety precautions, allows observation of correct mixing color, rise time, heat production, and general behavior and is performed prior to foaming the seat to become familiar with proper procedure. Providing adequate ventilation and wearing gloves 20 to prevent skin contact, one ounce quantities are poured into the test cups 21, and combined in a larger test mixture cup 23 and stirred for thirty seconds with the small stir stick 22. The mixture in the cup 23 is poured into a small clear polyethelene bag 24 and placed on spread newspaper for observation. The rise time is noted and the outside of the test bag 24 can be touched to realize the temperature produced by the reaction. The uniformity of the resulting foam is evidence of correct mixing.

Installation The first step in the installation of the shaped elastic upholstery/membrane cover 11 is to cut the cover to size (the cover has a surplus of material at its margins to allow fitment to a wide variety of seat shell designs). The cover 11 is postioned in the seat so that the closest contour match between the cover 11 and seat shell 10 is achieved with the stretch jersey laminate 11A facing the driver. The subject to be molded then sits on the cover 11 which is held in position with the help of an assistant. The assistant tugs at the eges of the cover to make sure no folds are trapped under the driver's buttocks, hips, or back and proceeds to stretch the cover 11 uniformly over the edge of the seat in steps, marking the line where the stretched cover 11 meets the edge of the seat with chalk 19. Prestretching the cover to approximately 60% of its possible elongation in this manner will create smooth contours in the finished product and prevent extention of the cover 11 beyond the margins of the seat shell 10 by the pressure of the reacting foam 13. The driver gets out of the seat and the cover 11 is removed for trimming. Excess material 75–100 mm (1½–2 inches) beyond the chalk line is cut away along the side and bottom edges of the cover 11 to facilitate installation. The top or upper-back portion is not trimmed at this time. The trimmed cover 11 is repositioned in the seat 10 and beginning at the center bottom of the seat 10, and with the center of the trim strip 12, the cover 11 is locked in place with the trim 12 following the chalk line until it is fastened at least halfway up the sides of the seat 10.

Installation of the overflow catch-bag 18 is the next step. The bag 18 itself is a common polyethylene trash bag of such dimensions that its opening can engulf the upper portion of the seat. The bag 18 is hung over the back of the seat 10, its opening on the driver's side. The lower side of the bag's opening is positioned about 150 mm (six inches) from the very top of the seat 10 and tape-sealed horizontally across the full face of the seat surface.

With the overflow bag 18 in place the clamping of the cover 11 continues until both sides of the bag 18 are trapped by the cover 11 and trim 12.

The subject to be molded is encouraged to wear whatever suit, uniform, or special clothing is worn during competition or regular use of the seat 10 during foaming. If the subject's body weight routinely swings 10 lb.s or more and is on the low side presently, it is suggested that an extra layer of elastic knit clothing be worn under the suit to allow for future body expansion with comfort. A "dry run" sit down is suggested before actual foaming to be sure that, if the fit is already tight, the clothing will not drag the cover 11 into folds. If so, folds can be prevented by laying a sheet of 1 or 2 mil. polyethelene plastic over the cover 11 to act a slippery surface between the clothing and cover 11.

The foam components 13 are handled and mixed as in the previous test. Again allowing adequate ventilation and wearing gloves 20 to prevent skin contact, each component is poured into a separate measuring cup in the same quantity. These cups 14 are then poured together into a mixing bucket 15 in a total quantity suggested to be 20–30% in excess of the estimated minimum required to be sure of a sufficient quantity to completely flow thoughout the volume between the subject seated on the cover 11 and the seat shell 10. [A total of 24 oz of 2 lb/ft$^3$ rigid foam is typically sufficient for a large size of the glass fiber seat in FIG. 1.]The mixture in the bucket 15 is thoroughly combined by stirring rapidly with a paint mixing-type stick 16 for 30 seconds or until the mixture no longer shows a variegated color.

The stirred mixture will typically begin to rise in as little as 30 seconds, so without delay the mixture is poured down the back of the seat shell 10 to form a puddle in the bottom of the seat and the unattached top of the cover 11 is pulled over the back of the seat and the top side of the overflow bag 18 is then pulled over the cover. While the assistant holds the cover 11 and bag 18 in place against the top of the seat 10 to prevent sagging, the driver sits down and puts hands and feet in positon at the controls, assuming an aggressive driving postion while keeping the chest expanded. The foam 13 typically expands quite rapidly for about three minutes and will set in as little as ten minutes, but the recommendation is made to remain thus seated for twenty minutes to assist adhesion between the expanding foam 13 and the cover 11.

The driver carefully leaves the seat without using the freshly-foamed part for support, as the contours created may still be deformed slightly until fully cured, which typically requires 24 hours.

Finishing the seat is simply a matter of tearing away the overflow bag 18, breaking or cutting any overflow foam from the top of the seat, and shaping any rough foam edge with a coarse cheese-grater-type file or knife to the same contour as the top of the seat shell 10. The cover 11 may then be wrapped over the final edge of the seat and secured with the edge trim 12 which is cut to form a neat butt joint. The remnant of cover material 11 remaining under the trim 12 edge is sliced away with a sharp blade and the installation is complete Although the description above contains many specificities, these should not be construed as limiting the scope of the invention but as merely providing illustrations of some of the presently preferred embodiments. For example, the elastic membrane/cover could be made of several other elastomer materials such as acrylate, butyl, Hypalon® (chlorosulfonated polyethylene), flourocarbon, flourosilicon, polysulfide, polyurethane, nitrile, silicone, styrene butadiene, or other material with the primary qualities of being elastic and impermeable to the foam mixture. The thickness of the closed-cell material could be increased to give significant degrees of cushion as well as increase the resulting membrane tensile strength to obtain different degrees of contouring where the body's distance from the shell at certain points would allow bulging of the cover from the pressure of the foam reaction. In other applications, the elastomer layer could be as thin as 1 mm, and while this would limit its insulation ability to keep the driver from the heat of the chemical reaction, driving suits for many activities are often thick fire-resistant materials that would serve the same purpose. The method of joining the pieces of the pattern that make up the cover could alternately be done with a specialized adhesive to bond the edges together in a butt joint. Zig-zag stitching to join the panels could be used to reinforce the glued joint, or combined with a tape seal to prevent leakage past the seam. The elastic membrane/cover may also be employed underneath more conventional upholstery combinations so that the form-fit could be achieved with all manner of final-finish coverings that might be more appropriate to deluxe furniture seating or fancy sportscar applications.

The stretch jersey material suggested as finish layer in the preferred embodiment can be of loop nylon, plush nylon, terry nylon, super-stretch nylon, polyester, Lycra® (currently employed), swiss pique, spandex, tricot, various double knit, triple knit, or other compositions that could be bonded to the closed-cell material.

The channel-section aluminum-reinforced edge trim Is not the only way the elastic upholstery/membrane cover could be attached to the seat shell edge. Various adhesive means could be utilized as well as fitting a clamping/sealing flange by means of screws, rivets, etc. The seat edge could also be fashioned with an integral channel into which the membrane could be pushed with a sealing cord or rope-like locking device in the manner of a door screen.

The simple overflow catch-bag arrangement could be replaced by holes in the seat shell though which the mixed foam components could be introduced, and through which foam overflow could be allowed to escape. Such a system would allow the upholstery/membrane cover to be preassembled to a seat shell. A seat shell fitted with external mounting studs or plates would not require access to the interior surface when mounting to a vehicle.

The expanding polyurethane foam could be custom-made to achieve varying density, resilience, rise time, and degrees of heat produced during reaction. All polyurethanes are based on the exothermic reaction of polyisocyanates with polyol molecules, containing hydroxyl groups. Relatively few basic isocyanates and a range of polyols of different molecular weights and fuctionalities are used to produce the whole spectrum of polyurethane materials.

Other polymer foams, such as sponge rubber or latex made with natural or synthetic rubber, polystyrene, phenolic, epoxy, urea-formaldehyde, vinyl, or the newer polypropylene, silicone, flourocarbon, polyaromatic, and polyheterocyclic foams, as well as foams based on butadiene-styrene, butadiene-acrylonitrile, neoprene, ABS, acrylics, cellulose acetate, inonomers and many others could also employed.

Thus the scope of the invention should be determined by the appended claims and their legal equivalents, rather than by the examples given.

What is claimed is:

1. A method of producing an individual form-fit in a shell-type seat, defined as a single surface folded or curved in such a way as to provide the human anatomy with lateral as well as vertical seat and back support, as employed in controlling a high-performance vehicle, the method comprising:

superimposing a shaped membrane made of fabric-faced, closed-cell elastomer over said shell-type seat, attaching said membrane to an edge of said shell-type seat;

applying an incipiently-reacting foam mixture between said membrane and shell-type seat; and causing a subject whose shape is to be reproduced to sit on said membrane while the reacting foam thus contained expands upward to provide positive support for the body of the subject and flows fully between the impression of the body and shell and sets up to produce a durably upholstered, supportive and fully-contoured impression of the body by the use of an adaptable kit allowing installation of the shell-type seat in a vehicle so as to capture a proper individual ergonomic relationship of the seat to vehicle controls, the adaptable kit comprising:

(a) a shaped, closed-cell elastomer membrane with laminated fabric facing to provide a finished appearance, of oversized margins, making it adaptable to seat shells of various individual shapes;

(b) a channel-section edge trim with which to lock said membrane securely to the edge of said seat shells by folding the membrane over the edge of the seat and pressing the channel-section edge trim over the covered edge to secure the membrane;

(c) foam components that can be mixed on site to produce an expanding mixture;

(d) an overflow catch bag positioned to capture any excess foam and noxious gases escaping;

(e) handling and mixing tools to prepare the foam;

(f) a piece of chalk to mark the correct position of the cover for installation to said seat shell; and (g) a test kit of cans, stir stick, mixing cup and a plastic bag to preview the behavior of the foam prior to introduction between said membrane and shell-type seat.

2. The method as defined in claim 1 wherein a conventional upholstery covering is superimposed over said attached elastic membrane so that the form-fit is achieved in conjunction with traditional upholstery finshes.

3. The method as defined in claim 1 wherein said membrane comprises a closed-cell elastomer sheet material bonded with a stretch jersey nylon material.

4. The method as defined in claim 1 wherein the foam is a resinous material classified as rigid that foams to a free-rise density of at least about 2 lbs/ft$^3$.

5. The method as defined in claim 1 wherein the foam is a resinous material classified as flexible that foams to a free-rise density of at least about 5 lbs/ft$^3$.

* * * * *